United States Patent
Maharaja

(10) Patent No.: US 11,907,186 B2
(45) Date of Patent: Feb. 20, 2024

(54) SYSTEM AND METHOD FOR ELECTRONIC DATA ARCHIVAL IN A DISTRIBUTED DATA NETWORK

(71) Applicant: BANK OF AMERICA CORPORATION, Charlotte, NC (US)

(72) Inventor: Raja Arumugam Maharaja, Tamil Nadu (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 44 days.

(21) Appl. No.: 17/725,591

(22) Filed: Apr. 21, 2022

(65) Prior Publication Data
US 2023/0342340 A1    Oct. 26, 2023

(51) Int. Cl.
*G06F 16/00* (2019.01)
*G06F 16/21* (2019.01)
*G06F 16/25* (2019.01)
*G06F 16/23* (2019.01)

(52) U.S. Cl.
CPC .......... *G06F 16/212* (2019.01); *G06F 16/219* (2019.01); *G06F 16/2365* (2019.01); *G06F 16/258* (2019.01)

(58) Field of Classification Search
None
See application file for complete search history.

(56) References Cited

U.S. PATENT DOCUMENTS

| | | |
|---|---|---|
| 5,219,032 A * | 6/1993 | Keen .................. G01L 1/25 177/210 FP |
| 8,656,048 B2 | 2/2014 | Payne et al. |
| 9,053,124 B1 | 6/2015 | Dornquast et al. |
| 9,160,764 B2 * | 10/2015 | Stiansen .............. H04L 63/1491 |
| 9,338,065 B2 * | 5/2016 | Vasseur .............. H04L 41/5009 |
| 10,535,120 B2 | 1/2020 | Edwards et al. |
| 10,540,578 B2 | 1/2020 | Madani et al. |
| 10,679,044 B2 | 6/2020 | Vaezi Joze et al. |
| 10,686,611 B2 | 6/2020 | Ramos et al. |
| 10,937,540 B2 | 3/2021 | Madani et al. |
| 10,963,542 B2 | 3/2021 | Li |
| 11,024,009 B2 | 6/2021 | Shi et al. |
| 11,250,485 B2 | 2/2022 | Fox |
| 11,275,819 B2 * | 3/2022 | Kursun .................. G06F 21/32 |
| 11,341,368 B2 | 5/2022 | Su et al. |
| 11,398,013 B2 | 7/2022 | Kearney et al. |

(Continued)

FOREIGN PATENT DOCUMENTS

| | | | | |
|---|---|---|---|---|
| CN | 111241069 A * | 6/2020 | .......... | G06F 16/212 |
| WO | WO-2018177252 A1 * | 10/2018 | ......... | G06F 16/1805 |

*Primary Examiner* — Jean M Corrielus
(74) *Attorney, Agent, or Firm* — Moore & Van Allen PLLC; Andrew T. Wood

(57) ABSTRACT

Embodiments of the invention are directed to a system, method, or computer program product for an approach to electronic data archival in a distributed data network. The system allows for replicating and transmitting data for archival purposes from a source to a destination using a machine learning algorithm. The machine learning algorithm selectively distributes only data which has changed within a database, and thus prevents the necessity of repetitively archiving an entire database. The system categorizes changed data based on the characteristics of the data, and thereafter distributes the data via a distributed data network.

17 Claims, 8 Drawing Sheets

(56) References Cited

U.S. PATENT DOCUMENTS

| | | |
|---|---|---|
| 11,436,429 B2 | 9/2022 | Jaganathan et al. |
| 11,494,595 B2 * | 11/2022 | Wu ........................ G06F 18/217 |
| 11,544,240 B1 * | 1/2023 | Carlile .................. G06F 16/258 |
| 11,631,156 B2 * | 4/2023 | Singh .......................... G06T 7/73 |
| | | 382/159 |
| 11,645,836 B1 * | 5/2023 | Manevitz ................. G06N 3/08 |
| | | 382/156 |
| 2009/0287837 A1 | 11/2009 | Felsher |
| 2014/0366132 A1 * | 12/2014 | Stiansen ............. H04L 63/1491 |
| | | 726/22 |
| 2017/0161641 A1 * | 6/2017 | Guirguis ................ G06N 20/10 |
| 2019/0188732 A1 * | 6/2019 | Hill .................... G06Q 30/0185 |
| 2019/0197358 A1 | 6/2019 | Madani et al. |
| 2019/0244138 A1 | 8/2019 | Bhowmick et al. |
| 2019/0279075 A1 | 9/2019 | Liu et al. |
| 2019/0354708 A1 * | 11/2019 | Fisher .................. G06F 16/212 |
| 2020/0065627 A1 | 2/2020 | Kaufhold et al. |
| 2020/0183047 A1 | 6/2020 | Denli et al. |
| 2020/0184053 A1 * | 6/2020 | Kursun ................. G06V 10/764 |
| 2020/0250177 A1 * | 8/2020 | Padmanabhan ........ G06F 16/214 |
| 2020/0293500 A1 | 9/2020 | Patil et al. |
| 2020/0342306 A1 * | 10/2020 | Giovannini ............... G06N 3/08 |
| 2021/0004358 A1 * | 1/2021 | Vijayalakshmi ....... G06F 16/258 |
| 2021/0019629 A1 * | 1/2021 | Chidlovskii ......... G06V 10/764 |
| 2022/0138181 A1 * | 5/2022 | Irazabal ............... G06F 16/2379 |
| | | 707/703 |
| 2023/0032590 A1 * | 2/2023 | Tran ...................... G06F 3/0631 |
| 2023/0083843 A1 * | 3/2023 | Sheela .................. G06F 16/212 |
| | | 707/803 |
| 2023/0214370 A1 * | 7/2023 | Michaelis ............... H04L 63/12 |
| | | 706/25 |
| 2023/0214422 A1 * | 7/2023 | Kwatra ................. G06F 16/783 |
| | | 707/736 |
| 2023/0281492 A1 * | 9/2023 | Cintas .................... G06N 3/045 |
| | | 706/46 |

* cited by examiner

SYSTEM AND METHOD FOR ELECTRONIC DATA ARCHIVAL IN A DISTRIBUTED DATA NETWORK

BACKGROUND

Currently, entities store data which requires archiving on a recurring basis for purposes of creating database archives. In such archiving processes, all of the data in a database will be transferred regardless of how many or few data records have actually changed in the interim since the previous archiving. Such a recurring archiving process uses unnecessary resources and time, and as such, there exists a need for a system and method for electronic data archival in a distributed data network which allows for intelligent targeted archiving of affected data without transferring redundant data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for electronic data archival in a distributed data network.

Currently, entities store data across a multitude of databases, and in order to prevent loss of data, archives of the data are created. Typically, these archives are created by creating copies of entire databases in secondary storage locations, and archives from any given moment in time are overwritten or supplemented with additional copies of entire databases. These archive processes are demanding of resources, time, and cost, and in some cases may lead to replication errors. Therefore, a more elegant way of creating data archives would solve a long-standing technical challenge such that resource usage is reduced, security is enhanced, and data are consistent between the database and the archive. The system described herein is able to receive data in a schema from a database, use a machine learning algorithm to divide the data into blocks and assign an assortment identifier to each block, wherein the assortment identifier will remain constant if the data is constant, and the assortment identifier will change if the underlying data is changed. The system then is able to review the changes to blocks and/or data within the schema to identify and characterize the types of changes which have occurred in the time since a prior iteration of the schema has been reviewed by the machine learning algorithm. By characterizing such changes, the system then creates categories based on the type of changes encountered and sorts the changes into the categories. Depending on the type of change, the data and/or blocks may be handled or prepared for transfer via a distributed ledger is various ways. Triggers are then associated with each of the categories, and the triggers are executed along the distributed ledger to create an archive of only the data contained or referenced to by the categories. In this way, only the data which has changed is transferred from the source to the destination, and time/resources are saved by not requiring the transferring of all the data regardless of whether it has changed or not.

Embodiments of the invention are directed to a system, method, or computer program product for electronic data archival in a distributed data network, the invention comprising receiving schema comprising data, parsing and dividing the data into blocks, creating a distributed ledger and assigning a separate distributed ledger for each schema owner, wherein a source and a destination each comprise a machine learning algorithm, using the machine learning algorithm at the source to create and assign an assortment identifier to each block, wherein the assortment identifier in unchanged if there are no changes to the data in the block, identifying changes to the data in the schema and distribute data into categories using the machine learning algorithm at the source, the categories used by the machine learning algorithm to determine how to transmit the data, and distributing the categories to the distributed ledger.

In some embodiments, or in combination with the previous embodiment, identifying changes in the schema using the machine learning algorithm further comprises generating a first category for new data, wherein new data is added to a new block, and the new block is added into the first category, generating a second category for attribute level changes, wherein a position indicator and the data to be changed are denoted and placed into the second category, generating a third category for small volume schema, wherein a GAN is implemented to convert the data to an image, and the image is placed into the third category, and dynamically generating one or more additional categories, wherein the data is placed into one or more additional categories.

In some embodiments, or in combination with any of the previous embodiments, distributing the categories to the distributed ledger further comprises using the at least a portion of the machine learning algorithm to create triggers for initiating data movement wherein creating triggers for initiating data movement further comprises for the first category, using a data movement trigger to initiate data movement, for the second category, using an update trigger to initiate data movement, for the third category, using a GAN trigger to initiate data movement, and for the fourth category, using a dynamic trigger to initiate data movement.

In some embodiments, or in combination with any of the previous embodiments, the processing device is further configured to execute the computer-readable program code to load the data onto the distributed ledger and use the machine learning algorithm to initiate a count match between the source and the destination.

In some embodiments, or in combination with any of the previous embodiments, when the GAN trigger converts the image into GAN data, and the destination schema is evaluated by the machine learning algorithm to determine the location of where the GAN data is to be placed.

In some embodiments, or in combination with any of the previous embodiments, the image is split and the machine learning algorithm loads the data into the destination at the correct location within the schema.

In some embodiments, or in combination with any of the previous embodiments, loading the data onto the distributed ledger further comprises a distributed ledger transaction, the distributed ledger transaction comprising a plurality of blocks, each block comprising a hash, a count, a data level information, a mismatch indicator, and the trigger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
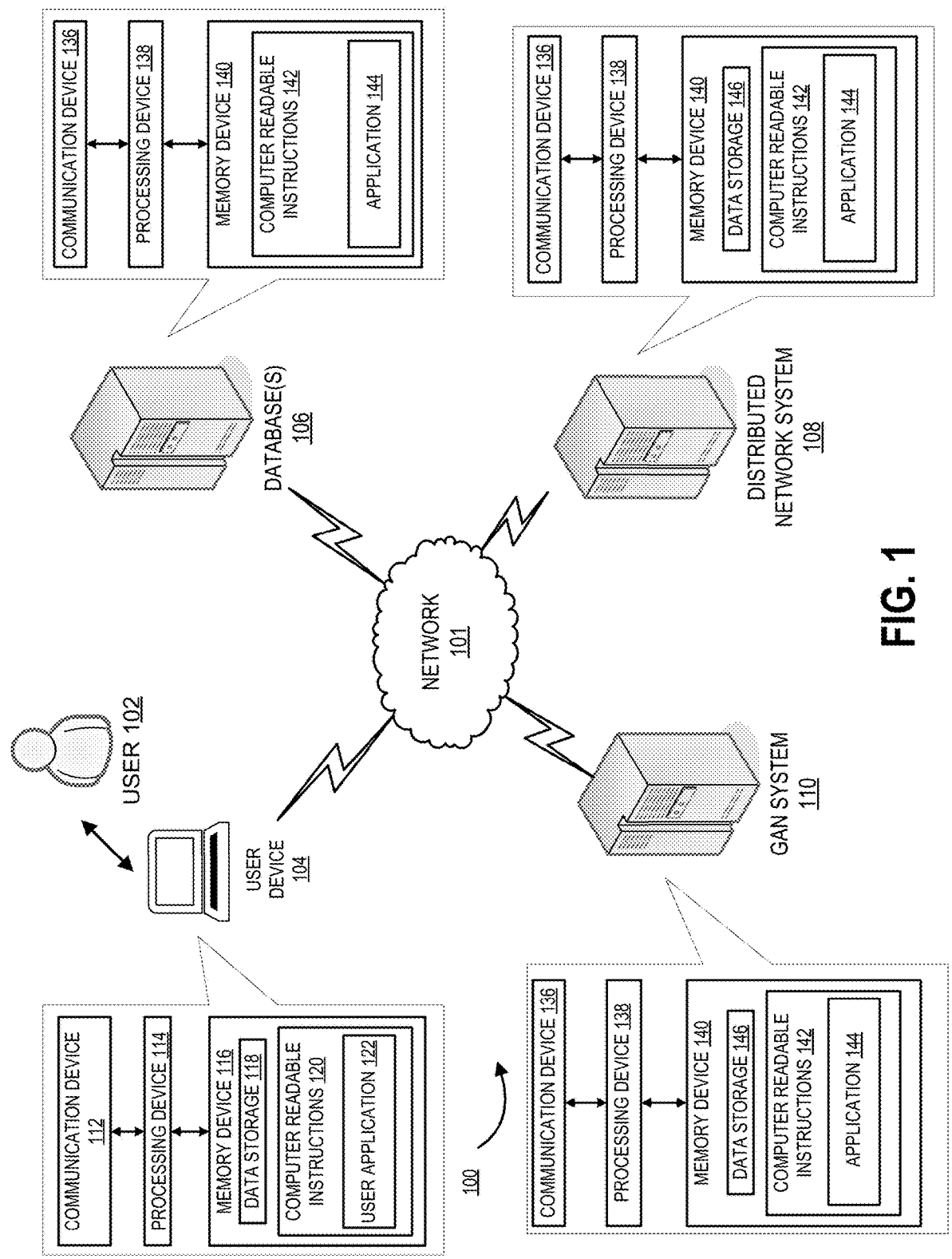
Figure 2A:
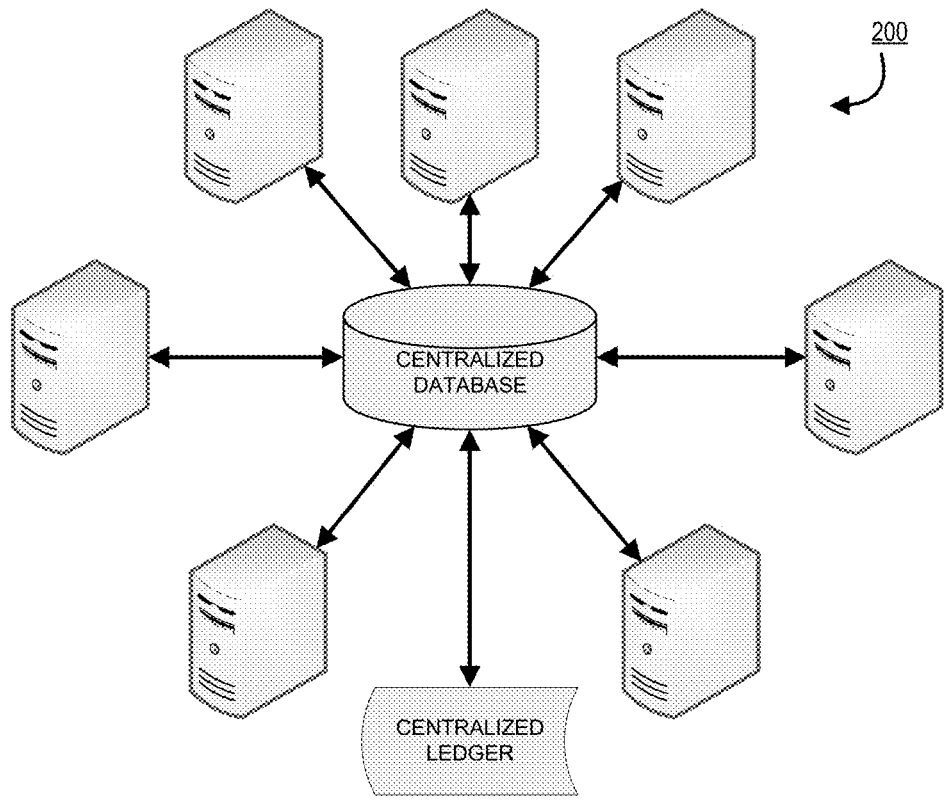
Figure 2B:
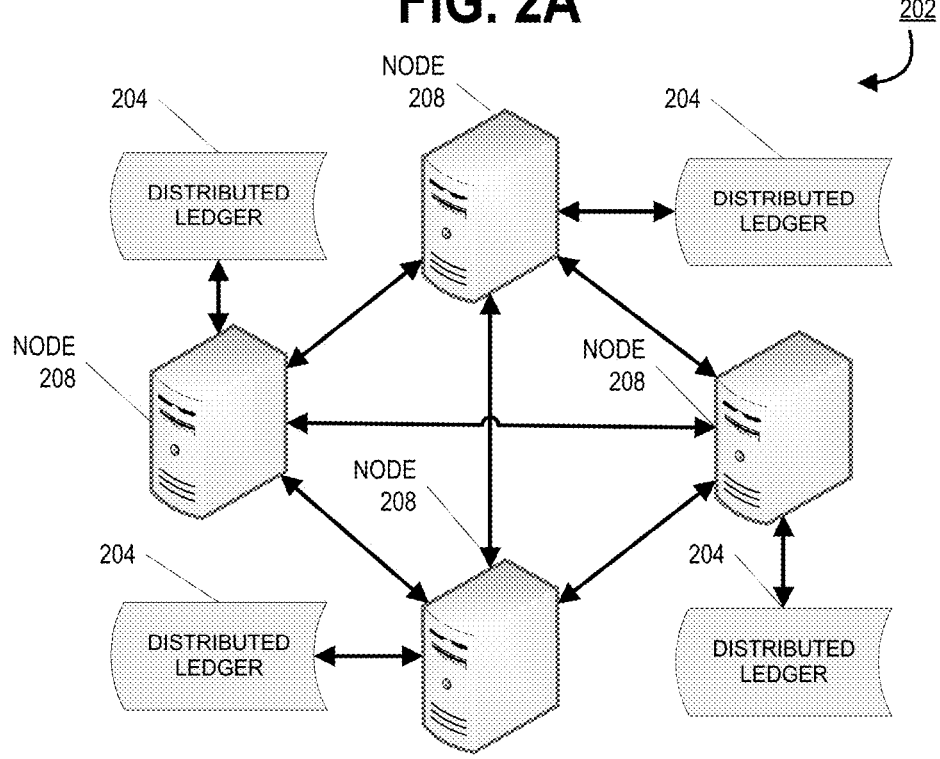
Figure 3:
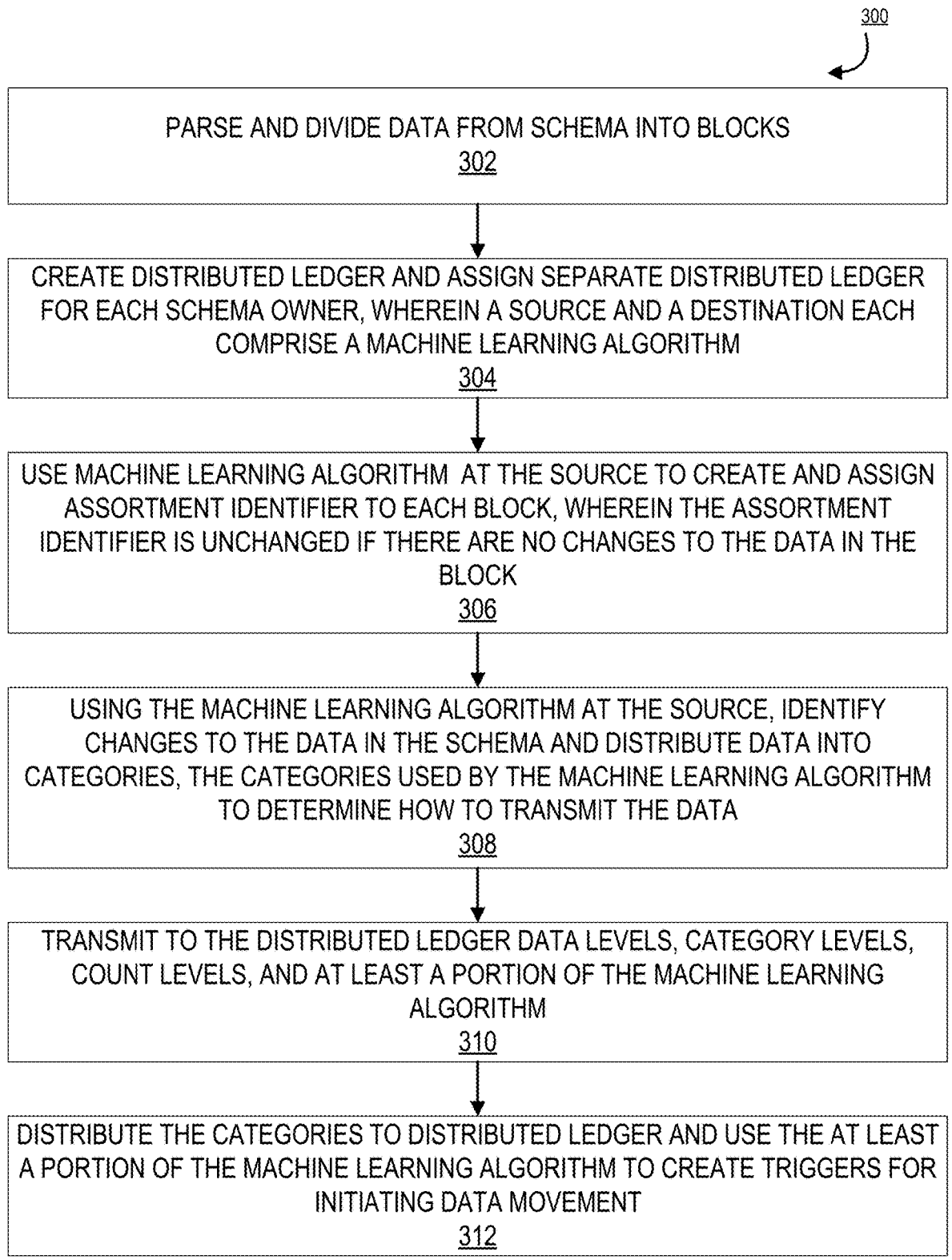
Figure 4:
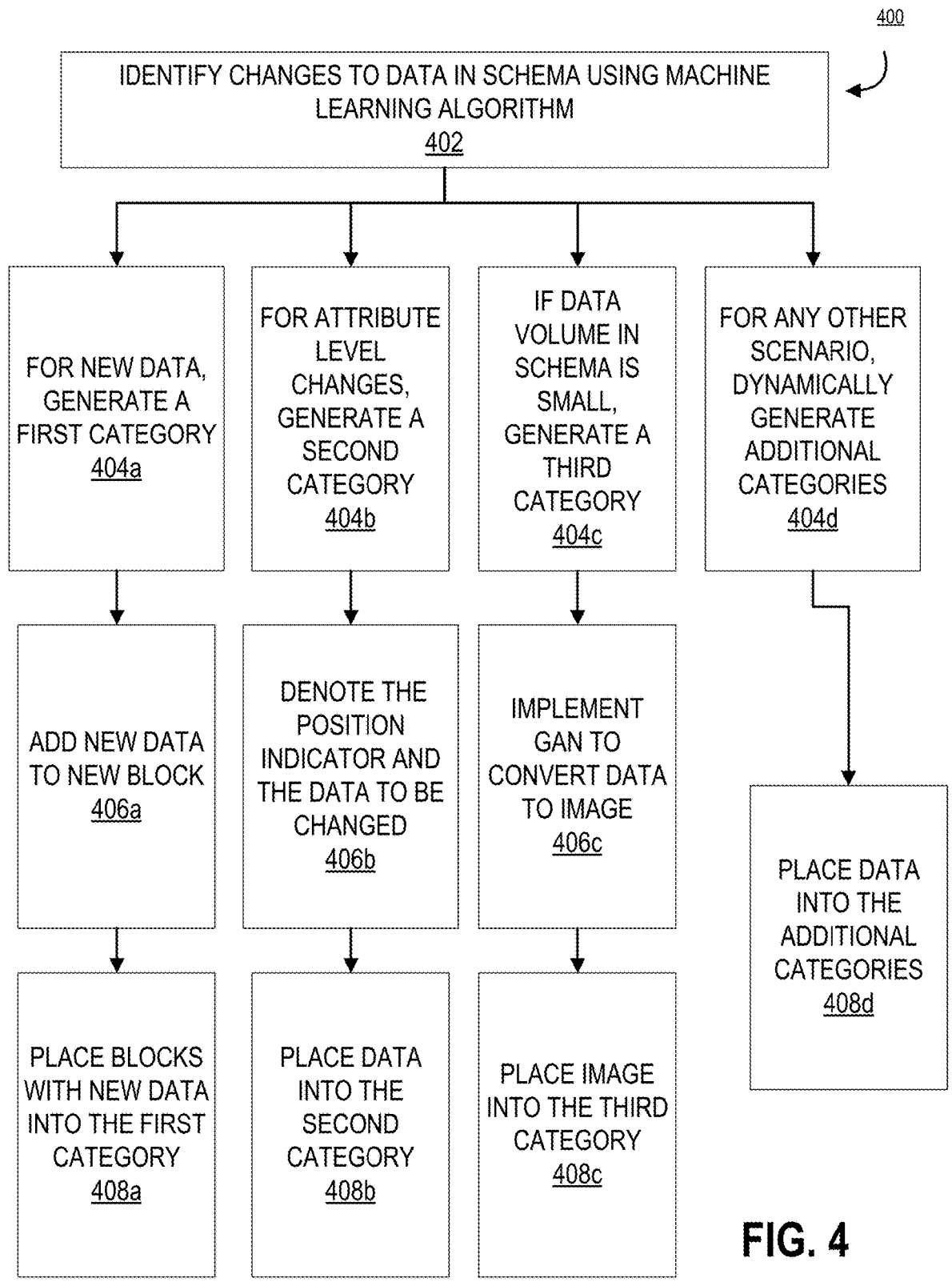
Figure 5:
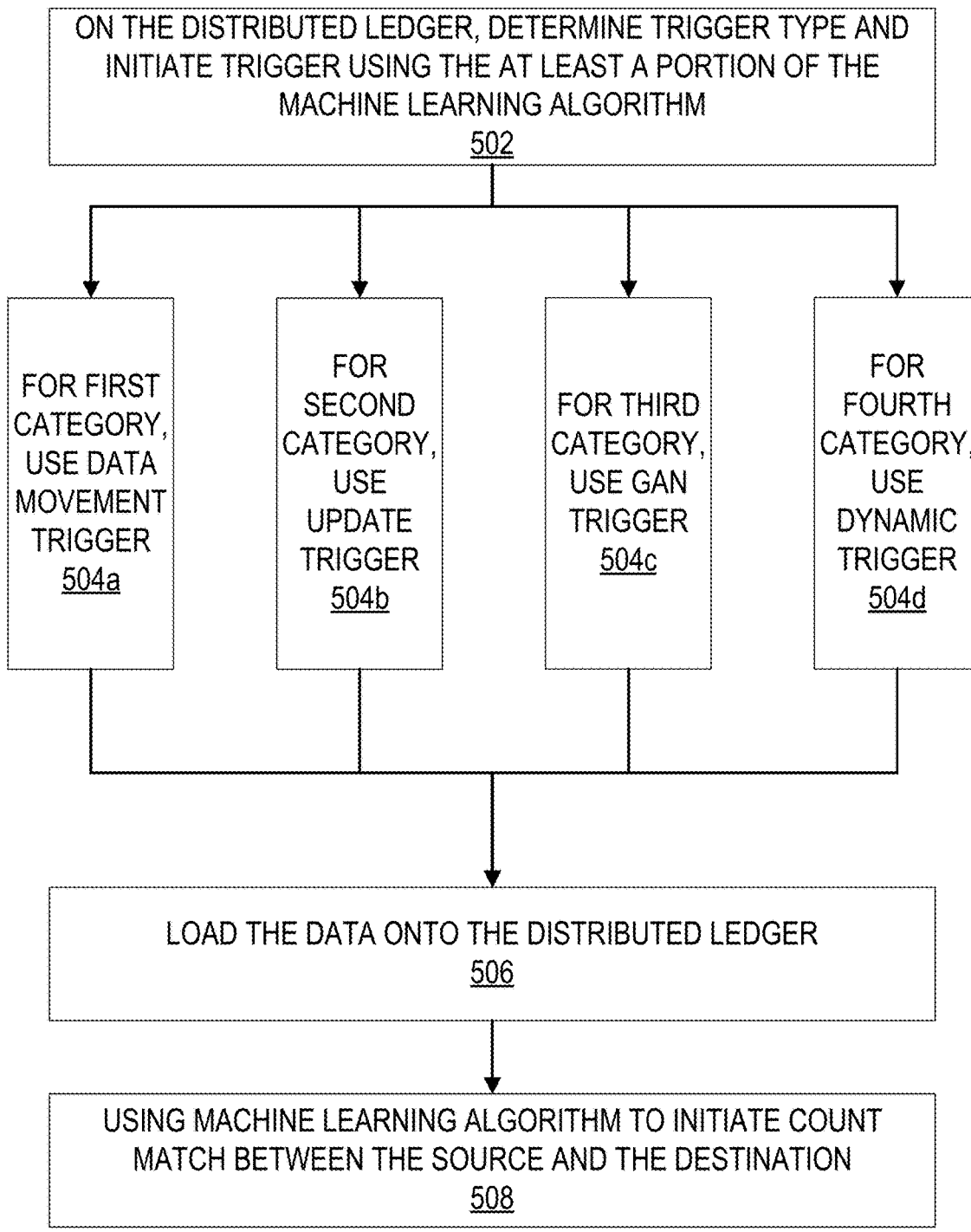
Figure 6:
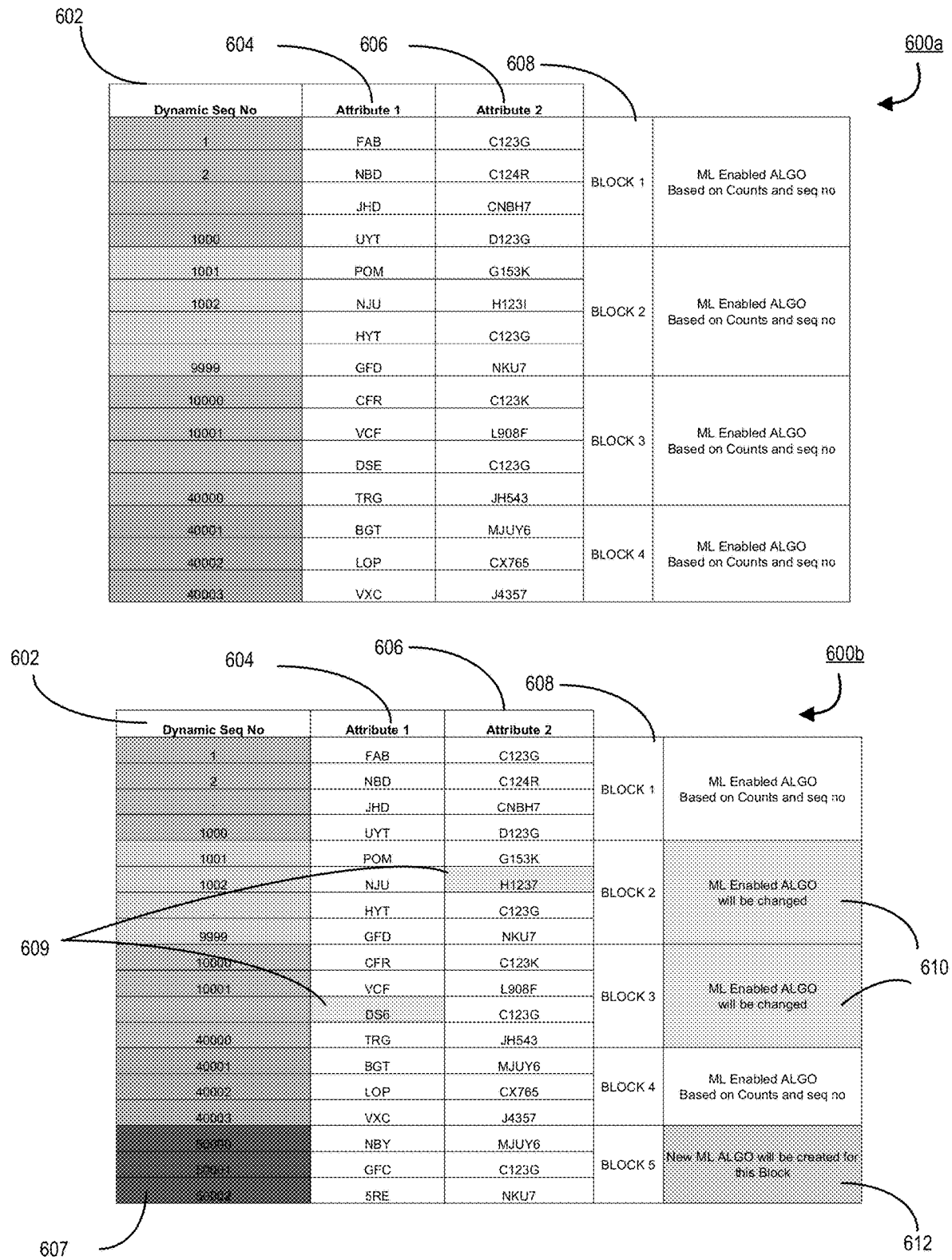
Figure 7:
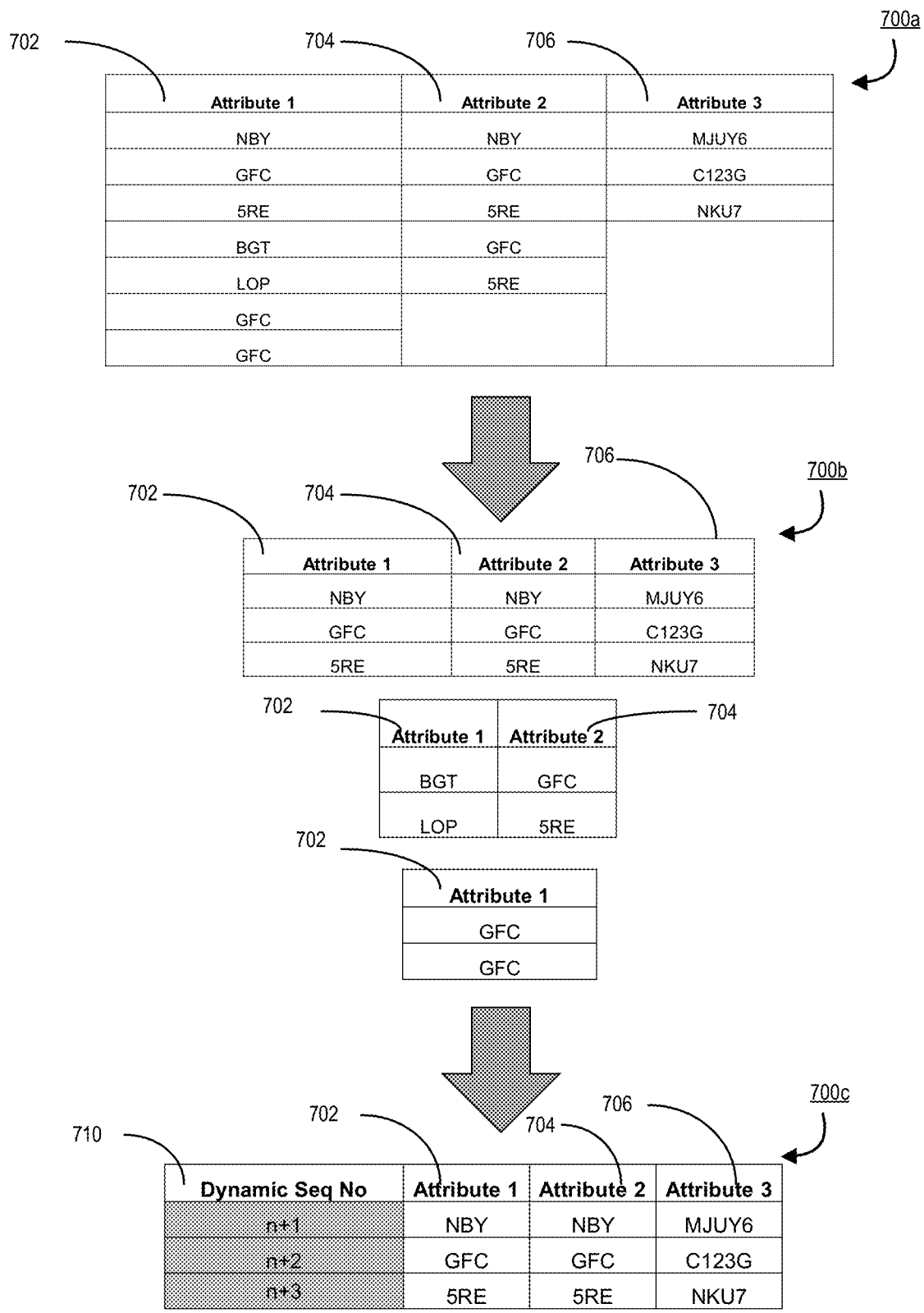
Figure 8:
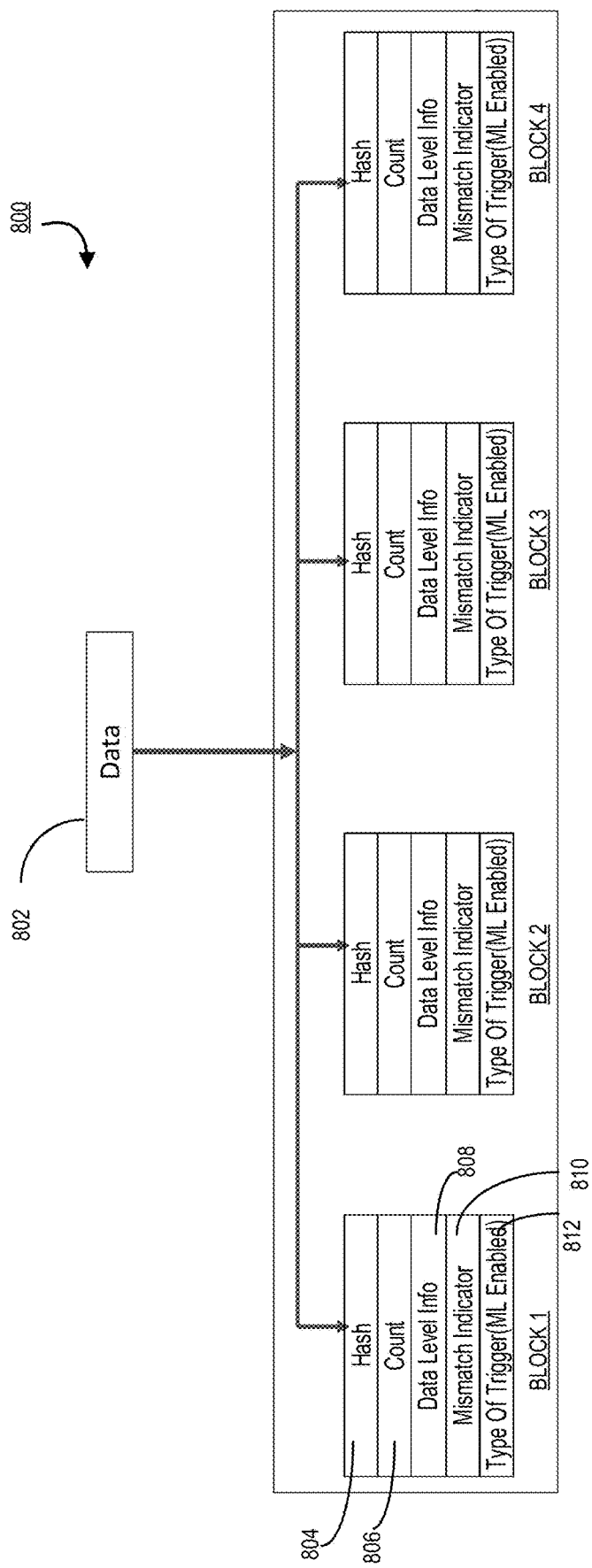

Having thus described embodiments of the invention in general terms, reference will now be made to the accompanying drawings, wherein:

FIG. 1 illustrates a network environment in which the processes described herein are implemented, according to some embodiments of the present invention;

FIG. 2A and FIG. 2B illustrate a centralized database and distributed network environment, respectively, in which the processes described herein are implemented, according to some embodiments of the present invention;

FIG. 3 is a block diagram of a method for electronic data archival in a distributed data network, according to some embodiments of the present invention;

FIG. 4 is a block diagram of a method for identifying and categorizing changes to data in schema using machine a learning algorithm, according to some embodiments of the present invention;

FIG. 5 is a block diagram of a method for determining a trigger type and initiating a trigger to load data to the distributed ledger, according to some embodiments of the present invention;

FIG. 6 is an illustration of assigning assortment identifiers and movement of a block to a first category, according to some embodiments of the present invention;

FIG. 7 is an illustration of converting an image to data using GAN, according to some embodiments of the present invention; and FIG. 8 is an illustration of a distributed ledger transaction, according to some embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the invention are directed to a system, method, or computer program product for electronic data archival in a distributed data network. Embodiments of the invention are directed to a system, method, or computer program product for an approach to electronic data archival in a distributed data network. The system allows for replicating and transmitting data for archival purposes from a source to a destination using a machine learning algorithm. The machine learning algorithm selectively distributes only data which has changed within a database, and thus prevents the necessity of repetitively archiving an entire database. The system categorizes changed data based on the characteristics of the data, and thereafter distributes the data via a distributed data network.

A "user" as used herein may refer to any entity or individual associated with the distributed network system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (TP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with a distributed network. An entity may refer to a business, company, or other organization that either maintains or operates the system or requests use and accesses the system. "Entity" may be used to include any organization that processes financial transactions including, but not limited to, banks, credit unions, savings and loan associations, investment companies, stock brokerages, resource management firms, insurance companies or the like.

The term "distributed network," as used herein, refers to a plurality of computer systems known as "nodes", each of which is in communication with one or more of the other nodes. Nodes may write a data "block" to a distributed ledger, the block comprising data regarding a resource transfer, electronic resource, accounts associated with a user such as checking, savings, loans, or the like. In some embodiments the blocks may comprise information about a user such as name, address, phone number, SSN, user identification records, account preferences, and so forth. In this way, the blocks comprise data and/or metadata. In some embodiments, only designated "miner" nodes may write or obtain a consensus on data written to the distributed ledger. In other embodiments, all nodes have the ability to write data to the distributed ledger. In some embodiments, one or more nodes may be designated as "superuser" nodes, such that nodes bearing this distinction are capable of modifying blocks in the distributed ledger. In an instance where blocks need error correcting, refinement to the data due to incorrect information, and so forth. In some embodiments, the block may further comprise a time stamp and a pointer to the previous block in the chain. In some embodiments, the block may further comprise metadata indicating the node that was the originator of the data. In this way, an entire record is not dependent on a single database which may serve as a single point of failure; the distributed network will persist so long as the nodes on the distributed network persist.

The term "distributed ledger" as used herein, refers to a decentralized electronic ledger of blocks which are authenticated by a federated consensus protocol, a copy of which is stored on multiple nodes of the distributed network. Multiple computer systems within the distributed network each comprise a copy of the entire ledger of records. Embodiments of the invention as described herein may utilize one, several, or a combination (i.e. hybrid) of a number of different consensus algorithms to ensure the integrity of the distributed ledger within the block chain. In some embodiments, the consensus mechanism may be a "proof of work" ("PoW") protocol, in which the nodes perform a series of calculations to solve a cryptographic puzzle. In other embodiments, the consensus mechanism may be a "proof of stake" ("PoS") protocol or delegated proof of stake protocol. Other examples of consensus mechanisms which may be utilized, as understood by one of ordinary skill in the art, are proof of capacity ("PoC"), proof of activity ("PoA"), proof of burn ("PoB"), proof of elapsed time ("PoET"), or the like. For instance, in order to validate a pending data record, the nodes may be required to calculate a hash via a hash algorithm (e.g. SHA256, SHA3-256, SHA-3, SHA3-512, Keccak-256, or the like) which satisfies certain conditions set by the system. Calculating a hash in this way may be referred to herein as "mining," and thus a node performing the mining may be referred to as "miners" or "miner nodes."

As used herein, a "database" refers to a singular data repository, data storage center, data lake, or the like, which may be associated with a certain line of business, account type, or the like. Each database contains data which is created by the entity by recording transactions, computer files, and so forth, wherein each database is subject to a repetitious archiving process with a secondary database, the contents of the database being desired to be copied and stored on the secondary database for posterity and information security purposes. As such, one database may be referred to as a "source", and a secondary database may be referred to as the "destination." In some embodiments, each database may comprise all data associated with one line of business, for example one database may be associated with card transactions, while another database may be associated with loan account information, and so forth. The entity may wish to create an archive of all of this information, and as such the method of the incumbent system is to create a second identical copy of the data from the source and replicate the entirety of the data to the destination. Embodiments of the present invention improve upon the incumbent system by only replicating selective portions of data which has been identified by a machine learning algorithm to be new, or that which is in close proximity to the new data (e.g. "affected data"), and then subsequently distributing the affected data to the source via the distributed ledger. In this way, there occurs a minimizing the amount of sensitive information transmitted across the entity, a significant reduction in the amount of resources and time required to conduct such a database archiving, and so forth.

As used herein, a "schema" may refer to the structure or organization structure of a database. Schema may refer to the visualization of a structure. As will be appreciated by one of ordinary skill in the art, schemas are generally created through use of modeling and may be used in the context of relational databases and/or object-oriented databases.

As used herein, a "machine learning model" or "machine learning algorithm" may refer to any software or software-implemented method which is configured to train, build, and deploy prediction models, classification models, algorithms, and/or machine learning operations ("MLOps"). In other words a machine learning algorithm uses training data to build a model in order to make predictions. Machine learning algorithms may use supervised learning, unsupervised learning, semi-supervised learning, reinforcement learning, dimensionality reduction, or any other number of approaches to compute rules which match and optimize inputs to outputs.

As used herein, a "GAN" may refer to a generative adversarial network, which describes an unsupervised learning machine learning framework in which two neural networks conduct a zero-sum logic to impose indirect training through the use of a adversarial network (e.g. one of the two neural networks) to dynamically update and determine at which point the adversarial is "fooled" by the generative network (e.g. the first neural network). GANs may be used to construct or deconstruct images to and from readable text, characters, or the like.

As used herein, a "data" refers to any electronic information entry contained on a database of an entity within a schema. The data may comprise an account number (such as a checking, savings, investment, retirement, or any other type of financial account), personal information such as name, address, phone number, internet protocol ("IP") addresses, social-security numbers, personal biometric data, employment information, credit information, or the like. Such data may also be stored in one or more encrypted formats, such that the data must be decrypted prior to use by the entity. Furthermore, data may also be divided into one or more "attributes" such that a combination of attributes, together, forms the data. The present invention may be configured to process one or more databases of data which presently stores information in a centralized ledger, and where the entity desires a duplicate archive copy of the database or multiple databases.

FIG. 1 illustrates a system that includes specialized systems and devices communicably linked across a distributive network of nodes required to perform a method for electronic data archival in a distributed data network. FIG. 1 provides an environment 100 for the system and, in accordance with one embodiment of the present invention.

As illustrated in FIG. 1, the distributed network system 108 is operatively coupled, via a network 101 to the user device 104, and to the database 106 and GAN system 110. In this way, distributed network system 108 can send information to and receive information from the user device 104, database 106 and GAN system 110. It shall be noted that in some embodiments of the invention, database 106 and GAN system 110 are merely one or more nodes along a distributed network system 108, and as such distributed network system 108 comprises database 106 and GAN system 110. FIG. 1 illustrates only one example of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network.

In some embodiments, the user 102 is an individual who has the ability and/or authority to access a distributed network system 108, database 106, GAN system 110, or the like. Those skilled in the art will appreciate that at least some example embodiments contemplate multiple such users. In some embodiments, the user 102 has a user device, such as a mobile phone, tabled, computer or the like. FIG. 1 also illustrates a user device 104. The user device 104 may be any communication device such as a smart phone, a telephone, a tablet, a computer, or the like, but is preferably a computing device or terminal. User device 104 can perform computing functions, and the device may be used by the user to access the system directly or through an application, online portal, internet browser, virtual private network, or other connection channel. The device may be a computer device within a network of connected computer devices that share one or more network storage locations.

The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the distributed network system 108, and the database(s) 106 and GAN system 110. As such, the communication device 112 generally comprises a modem, server, or other device for communicating with other devices on the network 101.

As further illustrated in FIG. 1, the user device 104 comprises computer-readable instructions 120 stored in the memory device 116, which in one embodiment includes the computer-readable instructions 120 of a user application 122 and data storage 118. A user device 104 is preferably a personal computing device or terminal, but it may be any communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 104 is depicted in FIG. 1, the system environment 100 may comprise a plurality of user devices 104. In some embodiments of the invention described herein, a plurality of user devices 104 is used. In other embodiments, user devices 104 are not necessary for the functionality of the system and may not be integrated into the system in any appreciable manner.

As illustrated in FIG. 1, the distributed network system 108 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the database(s) 106, GAN system 110, and the user device 104. As such, the communication device 136 generally comprises a modem, server, or other device for communicating with other devices on the network 101.

As further illustrated in FIG. 1, the distributed network system 108 comprises computer-readable instructions 142 stored in the memory device 140, which in one embodiment includes the computer-readable instructions 142 of an application 144. In some embodiments, memory device 140 includes data storage 146 for storing data related to the system environment, but not limited to data created and/or used by the application 144.

Embodiments of the distributed network system 108 may include multiple systems, servers, computers or the like maintained by one or many entities. FIG. 1 merely illustrates one of those systems that, typically, interacts with many other similar systems to form the distributed network and thereby has the ability to work on the distributed ledger, either in an authorizing or modifying capacity. In one embodiment of the invention, the distributed network system 108 is operated by a second entity that is a different or separate entity from the database 106 and/or GAN system 110. In some embodiments, the database 106 and GAN system 110 may be part of the distributed network system 108. Similarly, in some embodiments, the distributed network system 108 is part of the database 106.

In one non-limiting example of the distributed network system 108 the memory device 140 stores, an application 144 and a distributed ledger. In one embodiment of the invention, both the application 144 and the distributed network 108 may associate with the applications having computer executable program code that instructs the processing device 138 to operate the communication device 136 to perform certain communication functions described herein. In one embodiment, the computer-executable program code of an application associated with the distributed network and application 144 may also instruct the processing device 138 to perform certain logic, data processing, and data storage functions of the application.

The processing device 138 is configured to use the communication device 136 to gather data, such as data corresponding to database(s) 106 and the schema thereon, blocks, or other updates to the distributed ledger from various data sources such as other distributed network systems. It shall be noted that communication device 136 may be configured differently for each node of the distributed network system 108. For example, distributed networks system 108 may have certain nodes which are defined to be superusers, and such superusers may be configured to modify or alter the distributed ledger on the distributed network system 108 in a way in which other nodes are unable to. As such, an additional layer of malfeasance protection in enabled in the system by preventing modification by other nodes. The processing device 138 stores the data that it receives in its copy of the distributed ledger stored in the memory device 140. Distributed networks system 108 also comprises one or more miner nodes, in which the miner nodes are configured to execute the data process, validate or reach a consensus on new additions to the distributed ledger such as new data or blocks.

In the embodiment illustrated in FIG. 1 and described throughout much of this specification, the application 144 may perform a method for electronic data archival in a distributed data network. Application 144 may execute computer readable instructions configured receive data from one or more databases and/or nodes and store data on a distributed ledger of a distributed network. Application 144 may then be configured to analyze the data in a databases and conduct the archiving of a database from a source to a destination. Thereafter, the application 144 may notify or broadcast to a network of miner nodes that a particular data is undergoing the archival process, in order for the miner nodes to verify whether or not the data already exists on a ledger of the distributed network.

The archive, once generated by application 144, is compiled with other copies of the distributed ledger and a block is created by compiling the changes to the distributed ledger. A block is distributed to all the nodes of the distributed network and a consensus is performed. Once a block has reached consensus, using application 144 or a combined group of nodes or miner nodes using application 144, the block is distributed and appended to the distributed ledger, such that a copy of the block resides on each copy of the distributed ledger.

As illustrated in FIG. 1, the database 106 and GAN system 110 are connected to the distributed network system 108. In this way, while only one database 106 is illustrated in FIG. 1, it is understood that multiple databases may make up the system environment 100. The database 106 and GAN system 110 generally comprise a communication device 136, a processing device 138, and a memory device 140. The database 106 and GAN system 110 comprises computer readable instructions 142 stored in the memory device 140, which in one embodiment includes the computer readable instruction 142 of an application 144. The database 106 and GAN system 110 may communicate with the distributed network system 108.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 200, in accordance with one embodiment of the present invention. The centralized database architecture comprises multiple nodes from one or more sources that converge into a centralized database. The system, in this embodiment, may generate a single centralized ledger for data received from the various nodes. FIG. 2B provides a general distributed network system environment architecture 202, in accordance with one embodiment of the present invention. Rather than utilizing a centralized database of data for storing data, as discussed above in FIG. 2A, various embodiments of the invention may use a decentralized distributed network configuration or architecture (block chain) utilizing a distributed network system as shown in FIG. 2B.

A distributed ledger is a distributed database, distributed across a distributed network, that maintains a list of data blocks. Data block may comprise data such as real-time resource availability associated with one or more users, data such as account numbers, personal information, or the like, the security of which is enhanced by the distributed nature of the distributed network. A distributed network system typically includes several nodes, which may be one or more systems, machines, computers, databases, data stores or the like operably connected with one another. In some cases, each of the nodes or multiple nodes are maintained by different entities. A distributed network typically works without a central repository or single administrator. One well-known application of a distributed network is the public ledger of resource transfers for cryptocurrencies. Another application of a distributed network system as will be discussed herein is for use in storing data such as account numbers, type of account, personal information, user preferences, or the like. The data blocks recorded in the distributed network are enforced cryptographically and stored on the nodes of the distributed network.

A distributed network provides numerous advantages over traditional databases. A large number of nodes of a distributed network may reach a consensus regarding the validity of data. As such, the data may be referenced, validated, and cleared by one participant with a high level of confidence after the consensus has been reached.

As mentioned above and referring to FIG. 2B, a distributed network system 202 is typically decentralized-meaning that a distributed ledger 204 is maintained on multiple nodes 208 of the distributed network 202. One node in the distributed network may have a complete or partial copy of the entire ledger, set of ledgers, or set of data and/or blocks recorded on the distributed ledger. Recorded data in some distributed ledgers 204 may comprise information regarding account information, personal information, and so forth. Data entry is initiated at a node of a distributed network and communicated to the various nodes of the distributed network. Miner nodes may validate data, add a block comprising the data to its copy of the distributed ledger, its validation (in the form of a block) and/or other data to other nodes or miner. This other data may include time-stamping, such as is used in some distributed ledgers.

FIG. 3 illustrates a block diagram 300 of a method for electronic data archival in a distributed data network, in accordance with some embodiments of the present invention. The process begins in block 302 by parsing and dividing data from the schema into blocks. It shall be appreciated that large volumes of data may be arranged in various schema, and as such the system may perform over a distributed network more efficiently and predictably if the data within the schema is portioned into smaller blocks of data, each block containing a pre-determined number of data entries. The data may contain a first attribute and a second attribute, although in some embodiments the data may only have one attribute, or even a plurality of attributes. In any case, the system is configured to divide the data in the schema according to the sequence of the data, or position of the data within the schema, into a more manageable chunk of data for appending one or more blocks to a distributed ledger as opposed to appending the entire schema.

In block 304, the system is configured, if such an infrastructure does not exist yet, to create a distributed ledger and assign a separate distributed ledger for each schema owner, wherein a source and a destination each comprise a machine learning algorithm. The distributed ledger is configured to be private within the entity, such that only authorized users within an entity are able to be a part of the distributed network, and thus have access to the distributed ledger. Furthermore, each schema owner shall be provided with their own distributed ledger. A schema owner is typically a user who has control of the schema, and who is responsible for every object placed in the schema.

It shall also be noted that within the network is a first database, known as a "source", from which the data to be replicated/backed up originates. A second database, known as the "destination" is also along the distributed network, and the destination is the database to which the source data will be replicated. It shall also be noted that the distributed ledger within the source and the destination, or any other source and/or recipient of the transactions within the distributed ledger are, comprise a machine learning algorithm. In other words, the machine learning algorithm may be stored and/or executed on the distributed ledger.

In block 306, using the machine learning algorithm at the source, the machine learning algorithm creates and assigns an assortment identifier to each block. The blocks in each schema were created in block 302, and for utilization and change-tracking purposes, each of the blocks is assigned a unique assortment identifier which may contain numbers, letters, characters, or any combination of alphanumeric characters recognizable by the system. The assortment identifier will assist the machine learning algorithm in identifying each block. The assortment identifier may be created by the algorithm, said algorithm changing on a predetermined interval such as daily, hourly, or weekly. In this way, the determination of the assortment identifier is guaranteed to be unique for a given day, which will associate with a singular archive for a database, since the algorithm may assign an assortment identifier based on the contents of the data within the block itself such as the counts and the sequence number of the data. In other words, if the algorithm produces an assortment identifier "AbC123" for a block on January $1^{st}$, and the contents of the block change on January $1^{st}$, the assortment identifier for the second iteration of processing by the machine learning algorithm in determining which data has changed may lead to an assortment identifier "AbC345" for the same block, thus indicating to the machine learning algorithm that the block should be replicated for archiving purposes. However, the same block, on January $2^{nd}$, may not experience any updates. In this way, the first iteration of the assortment identifier generation may produce "XYZ123", followed by the same "XYZ123" assortment identifier during the second iteration. In other words, if there are no changes to the data in the block, or position of the data, or otherwise, the assortment identifier does not change.

The process continues in block 308 by, using the machine learning algorithm at the source, identifying changes to the data in the schema and distributing the data into categories, the categories used by the machine learning algorithm to determine how to transmit the data. As previously described in block 306, the system may undergo one or more iterations of data analysis by assigning assortment identifiers to various blocks within the schema, and thus use the changes in the assortment identifier to determine which blocks in the schema have changed, which blocks are new, etc. In addition to this, the machine learning algorithm is configured to determine the characteristics of the type of change which has occurred, and based on this information sort the various blocks, each of which contains data which has changed, into several categories. The categories will be discussed in greater detail as it pertains to FIG. 4. However, it should be appreciated at this stage that the machine learning algorithm detects whether i) the data is new data added to the schema, ii) the change in the data only comprises changes to attribute level changes, iii) the schema of the changing data is small in volume (e.g., not a large number of data entries), or iv) any other scenario.

The machine learning algorithm then uses the categories in which the blocks are placed in order to determine how to transmit the data to the distributed ledger. In other words, each category has pre-defined mechanisms (e.g., triggers) which direct the machine learning algorithm to transmit the data using a certain method. Triggers will be described fully herein at FIG. 5.

In block 310, the information from block 308 is sent to the distributed ledger, the information comprising the data level, category level, count levels, and at least a portion of the machine learning algorithm used for determination of the assortment identifiers. The "data level" refers to the actual changes which have occurred to the data. "Category level" refers to the category in which the new or changed data has been placed. "Count level" refers to the number of items (e.g., data) in a particular block or group of blocks to be backed up. All or some of the aforementioned information will be placed on the distributed ledger.

The process of FIG. 3 is finalized in block 312, where the categories are distributed to the distributed ledger, and where the system uses the at least a portion of the machine learning algorithm inbuilt into the distributed ledger to create triggers for initiating data movement. As previously discussed briefly, and as will be discussed fully in FIG. 5, each category which is transferred or placed onto the distributed ledger has pre-defined triggers associated with each category. Such triggers direct the machine learning algorithm to transmit the data using a certain method, depending on the category in which the data is placed, which is determined by the characteristics of the data to be backed up.

FIG. 4 illustrates a block diagram 400 of a method for identifying and categorizing changes to data in schema using machine a learning algorithm, in accordance with some embodiments of the present invention. As previously briefly described and shown in block 402, the machine learning algorithm is capable of determining based on comparing two or more iterations of analysis of one or more schema (using the assortment identifiers) the type of change which has occurred to data within one or more schema. In this way, the system will be able to efficiently transfer the data via the distributed ledger to create an archive of the one or more schema. By grouping data changes into several different categories, the machine learning algorithm improves the efficiency of the system, since certain types of data changes may be more efficient to transfer in a format more conducive to maintaining the integrity of an entire block, or as an image, or the like.

It shall be appreciated that although the system as will be described henceforth refers to four discrete categories (numbered one through four), certain embodiments of the invention, especially in situations where small data changes have occurred in the database, may utilize less that all four categories. In other embodiments, especially in conditions where a large and diverse group of data has changed in a database may utilize all four categories, and even additional categories beyond those which have been described herein.

In block 404a, when the machine learning algorithm determines that new data has been added to a schema that previously did not exist on the schema, the machine learning algorithm generates a first category. Subsequently, in block 406a, the machine learning algorithm places the new data into a new block within the schema. In this way, all of the new data which has been identified is together within a singular block for efficient replication. In some embodiments, it shall be appreciated that the new data may be so numerous as to require the creation of multiple new blocks for the data, and as such the system will organize the new data in a manner which is conducive to create a plurality of blocks, for example by only placing a predetermined number of new data in each block. Finally, in block 408a, the machine learning algorithm places the new blocks comprising the new data into the first category.

In block 404b, when the machine learning algorithm determines that the changes to data within a schema are directed to attribute level changes only, the machine learning algorithm generates a second category. An "attribute" refers to a descriptor for a data point or data object. In other words, the attribute is data which may describe other data, for example calendar dates, text, Boolean data, or the like. The attribute level changes are typically coupled to an indication of the position of the data to be changed via a position indicator as shown in block 406b. Thereafter, the data is placed into the second category, along with the position indicator designation.

In block 404c, the machine learning algorithm is configured to determine and identify changes wherein the data volume in the schema is small. For example, the schema may only comprise a handful of data, for example less than fifty, and as such the entire schema may be effectively and efficiently be transferred as a singular unit using the distributed ledger and thereby replicated for archiving. In this way, and as block 406c describes, a GAN system is implemented at this point to convert the data in the schema to an image. Thereafter, as illustrated by block 408c, the image of the data is then placed into the third category, as opposed to the data itself.

Finally, as illustrated by block 404d, the machine learning algorithm is configured to create one or more additional categories for any other scenario not described by blocks 404a-c. For example, a particular change in data may comprise additional criteria not specifically defined by the rules laid forth in block 404a-c, and as such the machine learning algorithm dynamically generates one or more additional categories for such data. Thereafter, and as shown in block 408d, the machine learning algorithm then places the data into the one or more additional categories.

FIG. 5 illustrates a block diagram 500 of a method for determining a trigger type and initiating a trigger to load data to the distributed ledger, according to some embodiments of the present invention, according to some embodiments of the present invention. The process begins in block 502, where the machine learning algorithm, which is inbuilt into the distributed ledger, determines the trigger type and initiates the trigger based on the previously described categories in which the data, schema, or images have been placed.

As illustrated by block 504a, for the first category which corresponds to the first category described in block 404a of FIG. 4 where new data has been identified and placed into one or more blocks, a data movement trigger is determined to be implemented. In this way, data is simply moved from the source to the destination.

As illustrated by block 504b for the second category which corresponds to the second category described in block 404b of FIG. 4 where attribute level changes have been identified, an update trigger is determined to be implemented. In this way, attributes of data which are to be updated are moved from the source to the destination alongside the position indicators coupled thereto.

As illustrated by block 504c for the third category which corresponds to the third category described in block 404c of FIG. 4 where the data volume in a schema is small, a GAN trigger is determined to be implemented. In this way, the GAN trigger is configured to use the GAN system to convert the image of the data and/or schema into data for use on the distributed ledger and therefore between the source and destination.

As illustrated by block 504d for the fourth category which corresponds to the fourth category described in block 404d of FIG. 4 where one or more additional categories may be created in order for the data which does not correspond with the first three categories. As such, a dynamic trigger may be determined to be implemented. Depending on the data contents of the one or more categories, a different trigger may be utilized, for example a GAN trigger, update trigger, or data movement trigger.

The process continues in block 506 where the system, via the machine learning algorithm, loads the data onto the distributed ledger as a result of implementing the triggers as defined in 504a-c. In this way, the data which has been transformed for use by the machine learning algorithm may be once again transformed to useable format such that the format is capable of being appended to the distributed ledger.

In block 508, the process is completed by the machine learning algorithm initiating and completing a count match between the source and the destination, such as to verify that all the data intended to be distributed to the destination by the source in conjunction with the distributed ledger has indeed occurred.

FIG. 6 illustrates a non-limiting example of assigning assortment identifiers and movement of a block to a first category, according to some embodiments of the present invention. A schema is shown in diagram 600a, wherein the schema has a sequence number 602 for each data, and each data comprising a first attribute 604 and a second attribute 606. As can be seen and as previously described in prior figures, the machine learning algorithm has divided or separated groups of data into blocks 608, as diagram 600a illustrates the schema after a first iteration of the machine learning algorithm.

In contrast, diagram 600b illustrates the schema after the second iteration. The machine learning algorithm has detected a change in attributes 609, which are now known to be different than the original first attribute 604 and second attribute 606 by recognition that the assortment identifiers (H1237 and DS6, in this embodiment) are different than the assortment identifiers previously found in the schema within the attributes. As such, changed blocks 610 have also been differentiated from blocks 608. As is also visible new data has also been identified which was not present during the first iteration, and thus the new sequence numbers 607 have been illustrated and appended to the schema. In this way, a new block 612 will be created with the new data. As previously noted, attribute level changes such as those indicated by attributes 609 will be placed into the second category, while the new block 612 will be placed in the first category.

FIG. 7 illustrates a non-limiting example of converting an image to data using GAN, according to some embodiments of the present invention. As previously described in FIG. 5, the GAN trigger is configured to use the GAN system to convert the image of the data and/or schema into data for use on the distributed ledger and therefore between the source and destination. In doing so, the system must first split the image into corrected or contextualized schema such that the machine learning algorithm can identify the data with corresponding schemas in the database, thus allowing for an easier conversion to data from the image.

As showing in diagram 700a, the GAN system receives an image of the data, with the image comprising a first attribute 702, a second attribute 704, and a third attribute 706. It shall be appreciated that this is a non-limiting example and as such, the image may comprise fewer or more attributes depending on the particular embodiment presented to the GAN system. Continuing to diagram 700b, the system is configured to split the image into sub-images such that a first sub-image comprises all data which comprises a first attribute 702, second attribute 704, and a third attribute 706, a second sub-image comprising data with only a first attribute 702 and second attribute 704, and a third sub-image comprising data with only a first attribute 702. It shall be noted that as a non-limiting example, some embodiments may more or less complex than that which is illustrated since data may be comprised of more or fewer attributes. In any case, the system divides the image into sub-images based on groups which share a common number of attributes. In this way, the context of each sub-image within a schema is known, and the machine learning algorithm is capable of matching the data with the corresponding schema on the destination. Once the context is known, the system is configured to convert using the GAN model the image to data and load the data into the destination at the correct location within the schema, as illustrated in diagram 700c. The system may also assign a sequence number 710 such that the position of the data within the schema is assigned and traceable relative to other sequence numbers within the schema.

FIG. 8 illustrates a non-limiting example of a distributed ledger transaction, according to some embodiments of the present invention. Diagram 800 illustrates the type of data on the distributed ledger transaction pursuant to each block which is appended to the distributed ledger. As shown in FIG. 8, each transaction may comprise multiple blocks, and the non-limiting example shown graphically comprises four blocks. The data 802 prior to the transaction will be manipulated and sorted as described in detail previously. Each block will contain a hash 804, a count 806, data level information 808, mismatch indicator 810, and the type of trigger 812. The hash 804 is essentially a function which converts the input of the data within the block into an encrypted output based on the contents of the data within the block. As such, the hash will remain the same if the data contained in the block is the same. The count 806 refers to the number of data within the block. Data level information 808 may refer to the actual changes which have occurred to the data. Mismatch indicator 810 is an indication of mismatch between the assortment identifier from the first or a previous iteration and a subsequent indication, this assortment identifier configured to indicate a change in the underlying data within a schema. The type of trigger 812, as previously discussed, indicates whether to use a movement trigger, update trigger, GAN trigger, or dynamic trigger. Such trigger(s) will be enabled and implemented by the machine learning algorithm to move data from the source to the destination in order to facilitate an archive of the data. This one or more trigger action, although not depicted graphically in FIG. 8, is a part of the transaction on the distributed ledger and represents the disposition of the blocks shown in FIG. 8.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic data archival in a distributed data network, the system comprising:
   a memory device with computer-readable program code stored thereon;
   a communication device;
   a processing device operatively coupled to the memory device and the communication device, wherein the processing device is configured to execute the computer-readable program code to:
   receive schema comprising data;
   parse and divide the data into blocks;
   create a distributed ledger and assign a separate distributed ledger for each schema owner, wherein a source and a destination each comprise a machine learning algorithm;
   use the machine learning algorithm at the source to create and assign an assortment identifier to each block, wherein the assortment identifier is unchanged if there are no changes to the data in the block;
   identify changes to the data in the schema based on changes to the assortment identifier and distribute data into categories using the machine learning algorithm at the source, the categories used by the machine learning algorithm to determine how to transmit the data, wherein the categories comprise:
   a first category for receiving new data, wherein the new data is added to a new block, and the new block is added into the first category,
   a second category for receiving attribute level changes, wherein a position indicator and the data to be changed are denoted and placed into the second category;
   a third category for receiving small volume schema, wherein a generative adversarial network is implemented to convert the data to an image, and the image is placed into the third category; and
   dynamically generated one or more additional categories, wherein the data is placed into the one or more additional categories; and
   distribute the categories to the distributed ledger.

2. The system of claim 1, wherein distributing the categories to the distributed ledger further comprises using the at least a portion of the machine learning algorithm to create triggers for initiating data movement wherein creating triggers for initiating data movement further comprises:
   for the first category, using a data movement trigger to initiate data movement;
   for the second category, using an update trigger to initiate data movement;
   for the third category, using a generative adversarial network trigger configured to convert the image into data corresponding to the image and to initiate data movement; and
   for the fourth category, using a dynamic trigger to initiate data movement.

3. The system of claim 2, wherein the processing device is further configured to execute the computer-readable program code to:
   load the data onto the distributed ledger; and
   use the machine learning algorithm to initiate a count match between the source and the destination.

4. The system of claim 3, wherein loading the data onto the distributed ledger further comprises a distributed ledger transaction, the distributed ledger transaction comprising a plurality of blocks, each block comprising a hash, a count, a data level information, a mismatch indicator, and the trigger.

5. The system of claim 2, wherein the destination schema is evaluated by the machine learning algorithm to determine the location of where the data corresponding to the image is to be placed.

6. The system of claim 5, wherein the image is split and the machine learning algorithm loads the data into the destination at the correct location within the schema.

7. A computer program product for electronic data archival in a distributed data network, the computer program product comprising at least one non-transitory computer-readable medium having computer-readable program code portions embodied therein, the computer-readable program code portions comprising:
   receiving schema comprising data;
   parsing and dividing the data into blocks;
   creating a distributed ledger and assigning a separate distributed ledger for each schema owner, wherein a source and a destination each comprise a machine learning algorithm;
   using the machine learning algorithm at the source to create and assign an assortment identifier to each block, wherein the assortment identifier is unchanged if there are no changes to the data in the block;
   identifying changes to the data in the schema based on changes to the assortment identifier and distribute data into categories using the machine learning algorithm at the source, the categories used by the machine learning algorithm to determine how to transmit the data, wherein the categories comprise:
   a first category for receiving new data, wherein the new data is added to a new block, and the new block is added into the first category;
   a second category for receiving attribute level changes, wherein a position indicator and the data to be changed are denoted and placed into the second category;
   a third category for receiving small volume schema, wherein a generative adversarial network is implemented to convert the data to an image, and the image is placed into the third category; and
   dynamically generated one or more additional categories, wherein the data is placed into the one or more additional categories; and
   distributing the categories to the distributed ledger.

8. The computer program product of claim 7, wherein distributing the categories to the distributed ledger further comprises using the at least a portion of the machine learning algorithm to create triggers for initiating data movement wherein creating triggers for initiating data movement further comprises:
- for the first category, using a data movement trigger to initiate data movement;
- for the second category, using an update trigger to initiate data movement;
- for the third category, using a generative adversarial network trigger configured to convert the image into data corresponding to the image and to initiate data movement; and
- for the fourth category, using a dynamic trigger to initiate data movement.

9. The computer program product of claim 8, wherein the processing device is further configured to execute the computer-readable program code to:
- load the data onto the distributed ledger; and
- use the machine learning algorithm to initiate a count match between the source and the destination.

10. The computer program product of claim 9, wherein loading the data onto the distributed ledger further comprises a distributed ledger transaction, the distributed ledger transaction comprising a plurality of blocks, each block comprising a hash, a count, a data level information, a mismatch indicator, and the trigger.

11. The computer program product of claim 8, wherein the destination schema is evaluated by the machine learning algorithm to determine the location of where the data corresponding to the image is to be placed.

12. The computer program product of claim 11, wherein the image is split and the machine learning algorithm loads the data into the destination at the correct location within the schema.

13. A computer-implemented method for electronic data archival in a distributed data network, the method comprising:
- providing a computing system comprising a computer processing device and a non-transitory computer readable medium, where the non-transitory computer readable medium comprises configured computer program instruction code, such that when said computer program instruction code is operated by said computer processing device, said computer processing device performs the following operations:
  - receiving schema comprising data;
  - parsing and dividing the data into blocks;
  - creating a distributed ledger and assigning a separate distributed ledger for each schema owner, wherein a source and a destination each comprise a machine learning algorithm;
  - using the machine learning algorithm at the source to create and assign an assortment identifier to each block, wherein the assortment identifier is unchanged if there are no changes to the data in the block;
  - identifying changes to the data in the schema and distribute data into categories using the machine learning algorithm at the source, the categories used by the machine learning algorithm to determine how to transmit the data, wherein the categories comprise:
    - a first category for receiving new data, wherein the new data is added to a new block, and the new block is added into the first category;
    - a second category for receiving attribute level changes, wherein a position indicator and the data to be changed are denoted and placed into the second category;
    - a third category for receiving small volume schema, wherein a generative adversarial network is implemented to convert the data to an image, and the image is placed into the third category; and
    - dynamically generated one or more additional categories, wherein the data is placed into the one or more additional categories; and
  - distributing the categories to the distributed ledger.

14. The computer-implemented method of claim 13, wherein distributing the categories to the distributed ledger further comprises using the at least a portion of the machine learning algorithm to create triggers for initiating data movement wherein creating triggers for initiating data movement further comprises:
- for the first category, using a data movement trigger to initiate data movement;
- for the second category, using an update trigger to initiate data movement;
- for the third category, using a generative adversarial network trigger configured to convert the image into data corresponding to the image and to initiate data movement; and
- for the fourth category, using a dynamic trigger to initiate data movement.

15. The computer-implemented method of claim 14, wherein the computer processing device further performs the following operations:
- loading the data onto the distributed ledger; and
- using the machine learning algorithm to initiate a count match between the source and the destination.

16. The computer-implemented method of claim 14, wherein the destination schema is evaluated by the machine learning algorithm to determine the location of where the data corresponding to the image is to be placed.

17. The computer-implemented method of claim 16, wherein the image is split and the machine learning algorithm loads the data into the destination at the correct location within the schema.

* * * * *